(12) United States Patent
Reichwein

(10) Patent No.: US 12,404,972 B2
(45) Date of Patent: Sep. 2, 2025

(54) METHOD AND PROCESS FOR STORING LIQUID AND GASEOUS FLUIDS UNDER PRESSURE IN A VERTICAL SUBSURFACE VESSEL

(71) Applicant: Melvin Charles Reichwein, Richmond, TX (US)

(72) Inventor: Melvin Charles Reichwein, Richmond, TX (US)

( * ) Notice: Subject to any disclaimer, the term of this patent is extended or adjusted under 35 U.S.C. 154(b) by 267 days.

(21) Appl. No.: 18/180,111

(22) Filed: Mar. 7, 2023

(65) Prior Publication Data
US 2023/0288025 A1      Sep. 14, 2023

Related U.S. Application Data

(60) Provisional application No. 63/318,787, filed on Mar. 11, 2022.

(51) Int. Cl.
| | | |
|---|---|---|
| *F17C 1/00* | (2006.01) | |
| *B65D 88/76* | (2006.01) | |
| *B65G 5/00* | (2006.01) | |
| *E21B 33/13* | (2006.01) | |

(52) U.S. Cl.
CPC .............. *F17C 1/007* (2013.01); *B65D 88/76* (2013.01); *B65G 5/00* (2013.01); *E21B 33/13* (2013.01); *F17C 2201/0109* (2013.01); *F17C 2203/012* (2013.01); *F17C 2205/0352* (2013.01); *F17C 2270/0149* (2013.01)

(58) Field of Classification Search
CPC .......... F17C 1/007; B65G 5/00; B65G 5/005; B65D 88/76
See application file for complete search history.

(56) References Cited

U.S. PATENT DOCUMENTS

| | | | |
|---|---|---|---|
| 3,307,361 A | * | 3/1967 | Waterman ............... E02D 27/38 |
| | | | 405/133 |
| 4,624,310 A | | 11/1986 | Echols et al. |
| 4,842,074 A | | 6/1989 | Hines et al. |
| 7,097,386 B2 | | 8/2006 | Maduell et al. |
| 7,921,573 B1 | | 4/2011 | Mancini et al. |
| 8,733,437 B2 | | 5/2014 | Ware et al. |
| 9,085,412 B1 | * | 7/2015 | Sasakura ............. F24D 11/0221 |
| 9,366,126 B2 | | 6/2016 | Tunget |

(Continued)

FOREIGN PATENT DOCUMENTS

| | | | | |
|---|---|---|---|---|
| CN | 105940169 A | * | 9/2016 | ............... E04H 7/02 |
| CN | 112942398 A | | 6/2021 | |

(Continued)

*Primary Examiner* — Frederick L Lagman
(74) *Attorney, Agent, or Firm* — LaMorte & Associates, P.C.

(57) ABSTRACT

A system and method for creating a subterranean storage facility at a location where there is underlying bedrock. A storage tank is provided that is formed from a cylindrical casing that is sealed with a top closure and a bottom closure. A first hole is excavated through the overburden. At the bottom of the first hole, a second hole is excavated into the bedrock. The storage tank is placed in the second hole with the top closure of the storage tank facing upward. The storage tank is set into the bedrock with a cement mixture. Pipe risers are extended into the storage tank through the first closure. The pipe risers extend up through the first hole and provide access to the storage tank.

15 Claims, 7 Drawing Sheets

(56) References Cited

U.S. PATENT DOCUMENTS

| | | |
|---|---|---|
| 10,017,324 B2 | 7/2018 | Drevich |
| 11,041,373 B2 | 6/2021 | Tritt et al. |
| 2006/0120806 A1 | 6/2006 | Leone et al. |
| 2014/0241803 A1 | 8/2014 | Tunget |

FOREIGN PATENT DOCUMENTS

| | | | | |
|---|---|---|---|---|
| JP | H0734711 A | * | 2/1995 | |
| KR | 100914650 B1 | | 8/2009 | |
| KR | 20130026046 A | * | 3/2013 | |
| KR | 20150061532 A | * | 6/2015 | |
| KR | 20160124418 A | * | 10/2016 | |
| WO | WO-2015080353 A1 | * | 6/2015 | ............... E04H 7/02 |
| WO | WO-2015080354 A1 | * | 6/2015 | ............... E04H 7/02 |

\* cited by examiner

METHOD AND PROCESS FOR STORING LIQUID AND GASEOUS FLUIDS UNDER PRESSURE IN A VERTICAL SUBSURFACE VESSEL

RELATED APPLICATIONS

This application claims the benefit of U.S. Provisional Patent Application No. 63/318,787, filed Mar. 11, 2022.

BACKGROUND OF THE INVENTION

1. Field of the Invention

In general, the present invention relates to systems and methods for storing liquid and/or gases under pressure in a vertically oriented subsurface vessel. More particularly, the present invention relates to safe storage systems for storing pressurized hazardous or nonhazardous fluids within an impervious vessel that is securely installed below the surface of the earth.

2. Prior Art Description

There are many hazardous and nonhazardous materials that are stored in pressurized tanks. For example, natural gas, petroleum distillates, liquefied gasses and the like are all stored in pressurized tanks to prevent the stored material from escaping into the ambient environment. Such materials can be stored under pressure in above-ground pressure vessels, in refrigerated, above-ground tanks operating at ambient pressure, or in pressurized subterranean storage caverns. Costs for above-ground storage units are significant. Above-ground storage facilities must be designed to resist the degrading effects of weather and the large temperature swings that occur between night and day and between the seasons. Above-ground storage facilities also require substantial surrounding infrastructure in case the storage facility were to leak, catch fire, or otherwise become compromised. As a result, a large area of land is needed to build above-ground storage facilities. Accordingly, there is a practical upper limit on the total fluid volume that can economically be stored in a given amount of space.

Underground storage facilities have the advantage of storing materials in a weatherproof and temperature stable environment. However, underground storage facilities are more difficult to construct than above-ground storage facilities. Accordingly, the costs associated with building and maintaining an underground storage facility are also significant. As a result, there is a practical lower limit on the fluid volume that can be economically stored in underground storage facilities.

In the prior art, underground storage facilities can be produced in multiple ways. For large storage needs, storage caverns are often dissolved within large deposits of salt. Such salt caverns are described in U.S. Pat. No. 11,041,373 to Tritt and U.S. Pat. No. 7,097,386 to Maduell. Although salt caverns are highly economical in storing large volumes of material, the use of salt caverns requires large underground deposits of salt. Such geological features only occur in a few places on earth. Accordingly, the use of salt caverns for local storage needs is often not possible.

If use of a salt cavern is impossible or impractical at a certain location, then an underground tank can be used. Such an underground storage facility first requires that a large hole be dug in the earth. A pre-manufactured tank is then placed in the hole and is buried. Since a large hole first needs to be constructed, the hole is typically dug into the overburden soil that is present above the bedrock. This is because it if far easier and cheaper to dig into the overburden than it is to dig into the bedrock. Once the tank is set into the hole, it is buried. Problems occur decades later when the tanks begin to leak. Leaks from underground tanks are very hard to detect. Furthermore, since the leaks are into the overburden, the leaking fluid can permeate through the ground throughout a wide area. This causes extensive ground contamination and well water contamination.

A need therefore exists for an improved subterranean storage system that can store large volumes of materials in an economical manner, where the storage system can be created in most geological areas. A need also exists for a subterranean storage system that can safely hold pressurized gases and liquid, can rapidly detect any leakages, and can isolate any leakages that occur. These needs are met be the present invention as described and claimed below.

SUMMARY OF THE INVENTION

The present invention is a system and method for creating a subterranean storage facility at a location where there is underlying bedrock. A storage tank is provided that is formed from a cylindrical casing that is sealed with a top closure and a bottom closure. The storage tank has a maximum first width and a maximum first length and is sized to be moved by a large mobile crane.

At a selected site, a first hole is excavated through the overburden to access the underlying bedrock. The first hole can be lined with a casing. At the bottom of the first hole, a second hole is drilled into the bedrock. The second hole is wider and longer than the storage tank.

The storage tank is assembled as sections of it are lowered into the second hole with the top closure of the storage tank facing upward through the first hole. When the storage tank is fully lowered and assembled into position, gap spaces exist between the exterior of the storage tank and the interior of the second hole. A cement mixture is used to fill the gap space. The cement mixture and the surrounding bedrock reinforce the storage tank and firmly secure it into position.

Pipe risers are extended into the storage tank through the first closure. The pipe risers extend up through the first hole and provide access to the storage tank.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention subterranean storage system and method can be configured in multiple ways, only a few exemplary embodiments are illustrated. The exemplary configurations are being shown for the purposes of explanation and description. The exemplary configurations set forth some of the best modes contemplated for the operation of the system. The illustrated configurations, however, are merely exemplary and should not be considered limitations when interpreting the scope of the appended claims.

Figure 1:
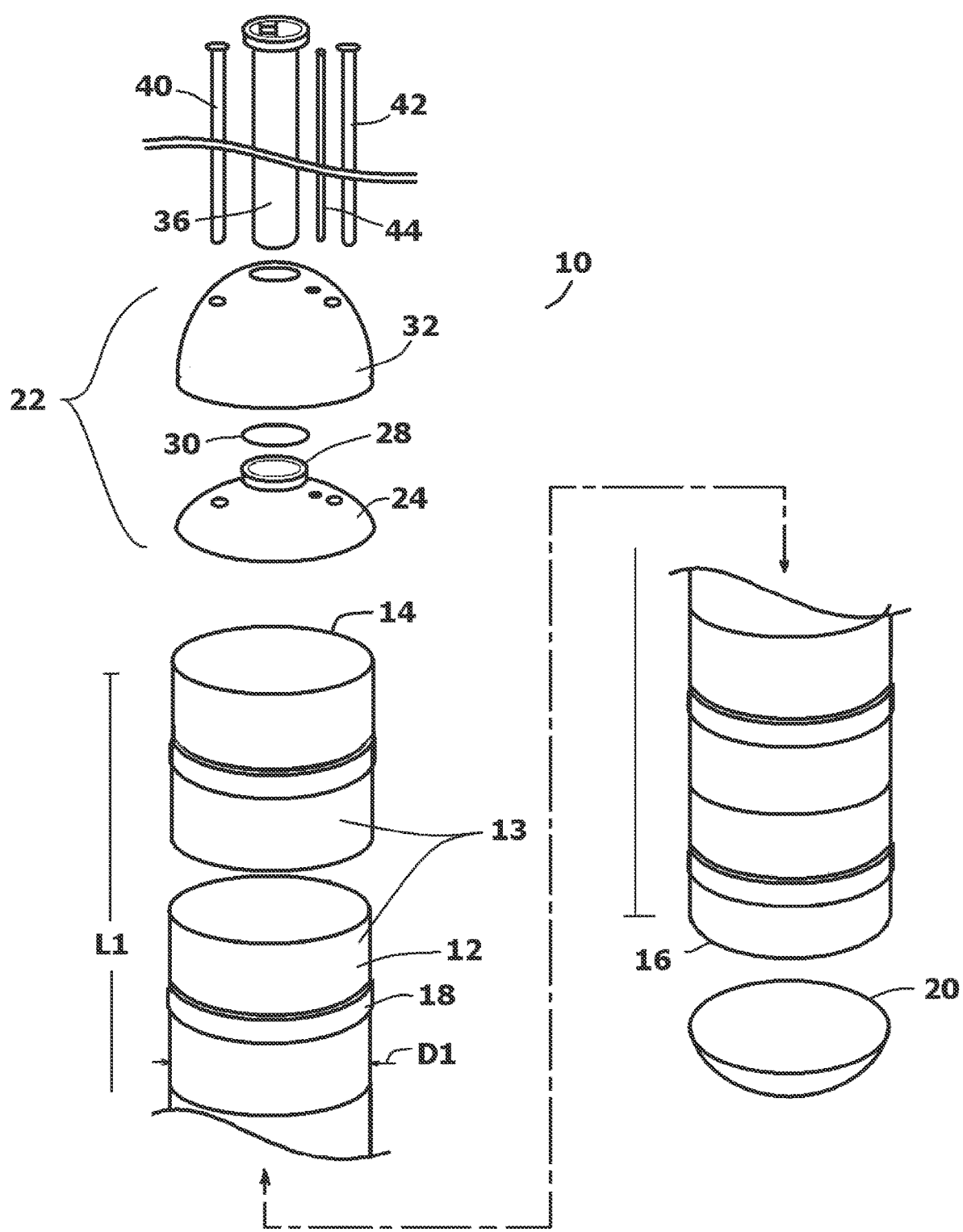
FIG. 1 shows an exploded exemplary embodiment of a subterranean storage system
Figure 2:
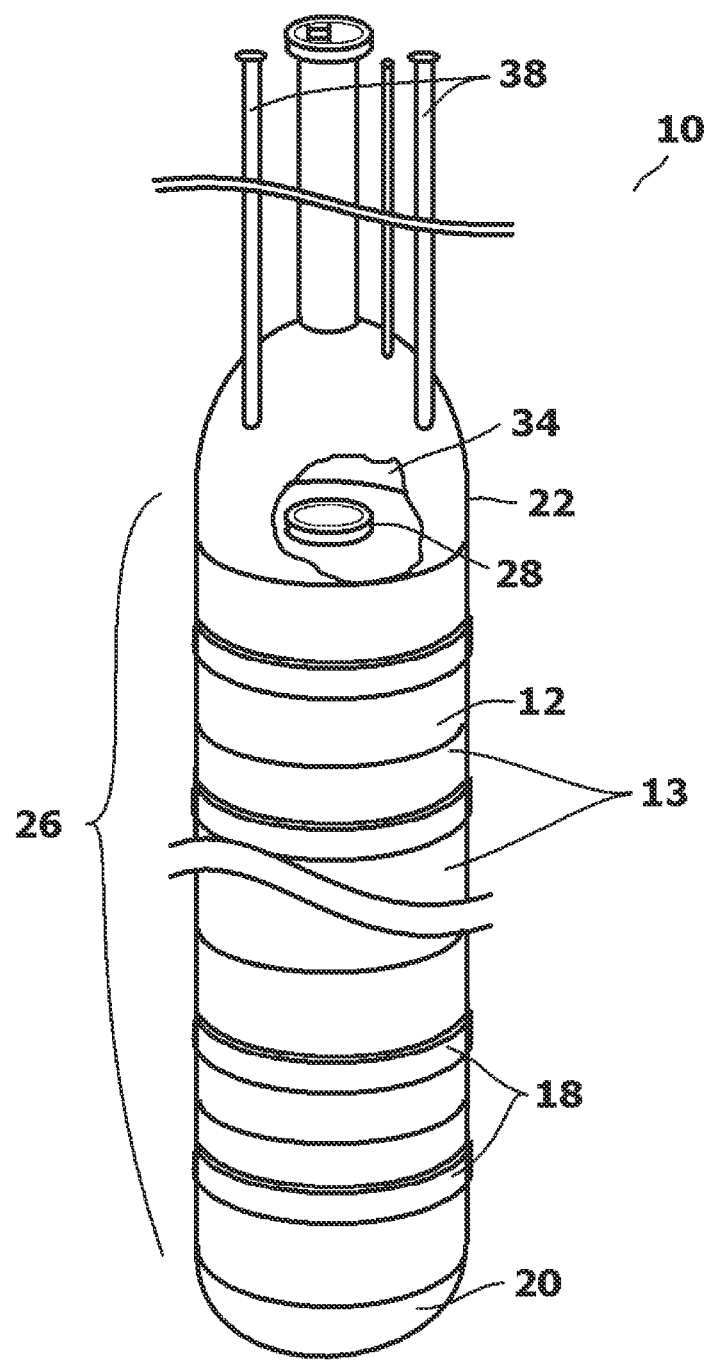
FIG. 2 is an assembled view of the exemplary embodiment of FIG. 1 with a partially fragmented features to illustrate internal components.

Referring to FIG. 1 and FIG. 2, a storage assembly is shown that is designed to be set into the ground. The storage assembly 10 has a cylindrical casing 12 that is made of steel. The thickness of the steel depends upon the application variables, such as the capacity and bursting pressure selected for the cylindrical casing 12. The cylindrical casing 12 has a first end 14 and an opposite second end 16. The length L1 between the first end 14 and the second end 16, as well as the diameter D1 of the cylindrical casing 12 determine the holding capacity of the cylindrical casing 12. In the preferred embodiment, the diameter is between four feet and ten feet. The length is between one hundred feet and two thousand feet.

Reinforcement rings 18 can be welded to the exterior and/or the interior of the cylindrical casing 12. The reinforcement rings 18 increase both the bursting pressure and the crush pressure of the cylindrical casing 121. The reinforcement rings 18 are preferably located on the exterior of the cylindrical casing 12. In this manner, the reinforcement rings 18 can help encasement material, such as concrete, bond to the exterior of the cylindrical casing 12, as will later be explained.

The second end 16 of the cylindrical casing 12 is capped with a pressure containment closure 20 that is designed to meet or exceed the selected bursting pressure of the cylindrical casing 12. The opposite first end 14 of the cylindrical casing 12 is capped with a double containment closure 22. The double containment closure 22 includes an end closure 24 that seals the first end 14 of the cylindrical casing 12. Accordingly, the cylindrical casing 12 between the pressure containment closure 20 and the end closure 24 defines a main storage tank 26. An ingress port 28 can be disposed in the end closure 24. The ingress port 28 provides access into the main storage tank 26 from outside the main storage tank 26. The ingress port 28 is preferably large enough for a person to physically pass into and out of the main storage tank 26. The ingress port 28 is sealed with a removable closure. The outer closure 32 provides additional physical protection for the inner closure 24. The double containment closure 22 also provides a pressurized interstitial space via the access riser 36 for monitoring the containment integrity of each closure 24 and 32.

The double containment closure 22 also includes a second closure 32 that is positioned over the end closure 24. This creates an interstitial space 34 between the end closure 24 and the second closure 32. The interstitial space 34 is large enough to provide physical access to the removable closure 30 and the ingress port 28 it covers. A manway tunnel tube 36 is provided that extends through the second closure 32 and provides access to the interstitial space 34. As such, a person attempting to reach the ingress port 28 of the main storage tank 26 would first have to enter the interstitial space 34 through the manway tunnel tube 36.

A plurality of pipe risers 38 extend into the main storage tank 26. The pipe risers 38 include a low point riser 40 that extends deep into the main storage tank 26 and terminates near the second end 16 of the cylindrical casing 26. In this manner, material can be pumped into the bottom of the main storage tank 26 or drawn from the bottom of the main storage tank 26. A high point pipe riser 42 is provided that extends into the main storage tank 26 and terminates near the first end 14 of the cylindrical casing 12. In this manner, material can be pumped into the top of the main storage tank 26 or drawn out of the top of the main storage tank 26.

A third pipe riser 44 is provided that also extends into the main storage tank 26. The third pipe riser 44 provides a pathway to monitoring equipment 46. The monitoring equipment 46 (FIG. 7) can include pressure sensors, temperature sensors, fluid level sensors, and the like. The third pipe riser 44 can also serve as a conduit for the insertion and removal of diagnostic tools, such as gas and liquid sampling equipment.

Figure 3:
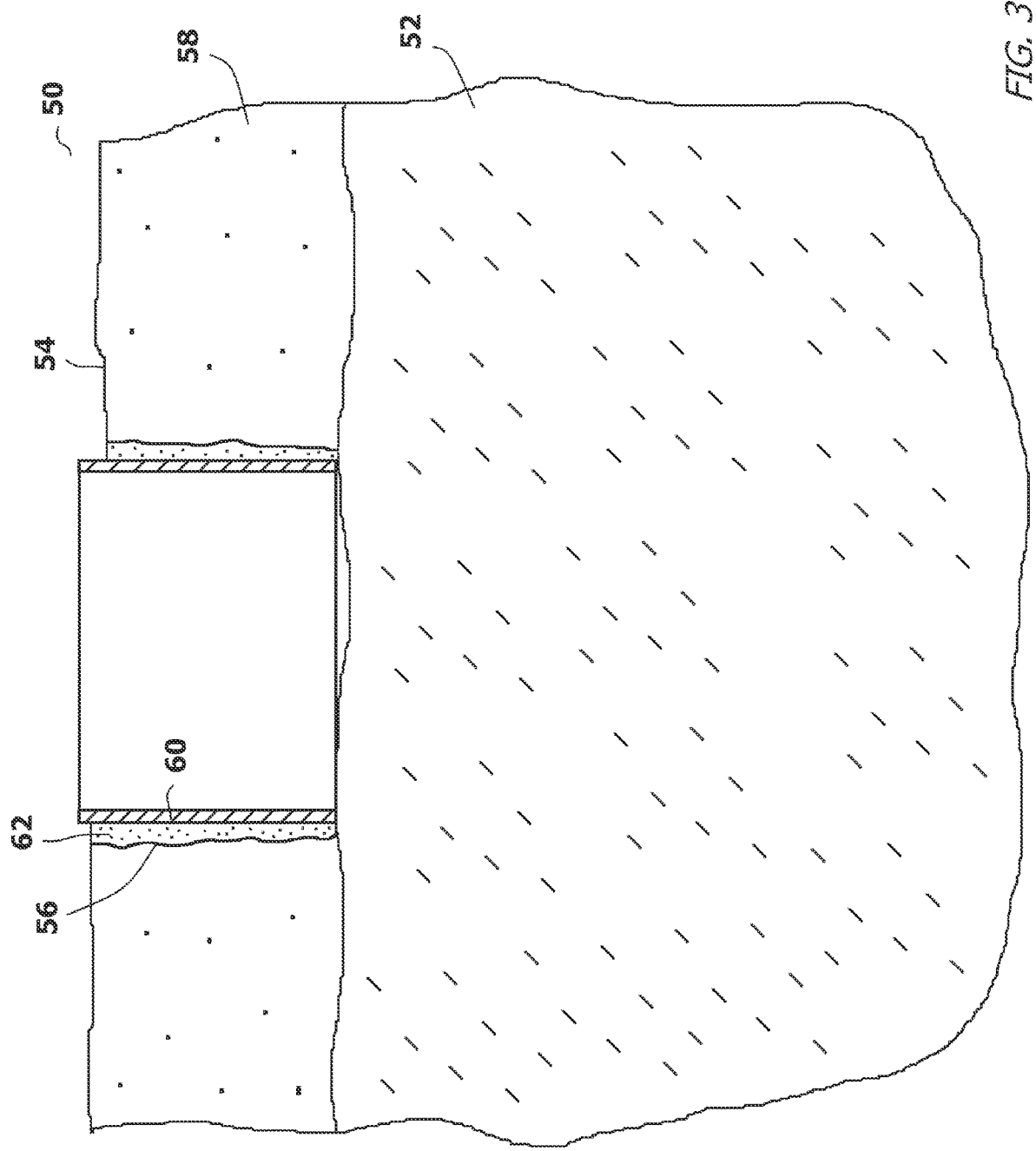
FIG. 3 shows a first step in constructing the subterranean storage system.

Referring to FIG. 3 in conjunction with FIG. 2, it will be understood that an installation site 50 is selected. The installation site 50 can be any land location where there is bedrock 52 located within a reasonable distance from the ground surface 54. An initial hole 56 is excavated through the overburden 58 between the ground surface 54 and the bedrock 52. The initial hole 56 is lined with an overburden casing 60. The overburden casing 60 is anchored into the overburden 58 using a well cement 62. The overburden casing 60 defines an internal opening 64 that is wider than the widest section of the storage assembly 10.

Figure 4:
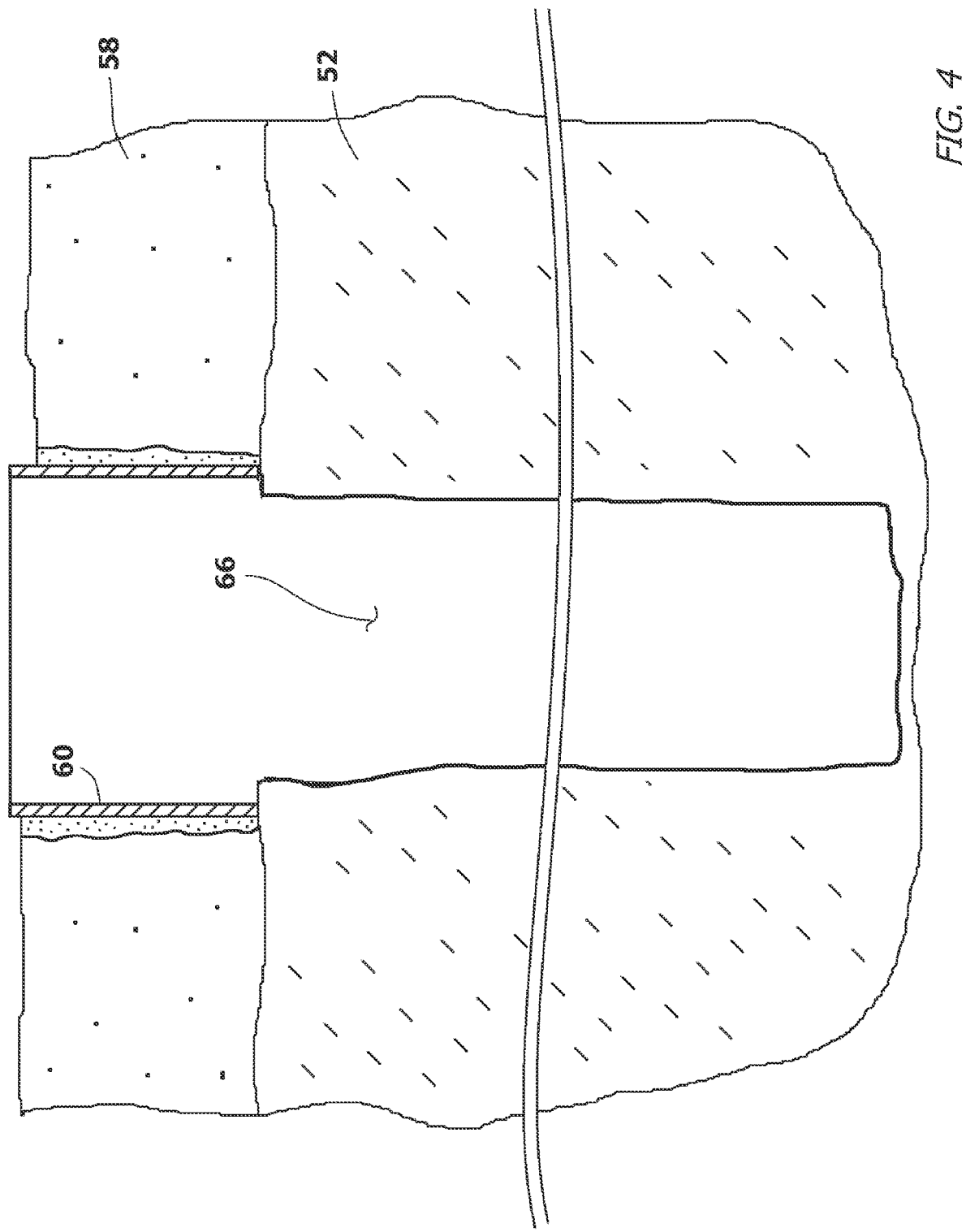
FIG. 4 shows a second step in constructing the subterranean storage system.

Referring to FIG. 4 in conjunction with FIG. 1, it can be seen that once the overburden casing 60 is set, a secondary hole 66 is excavated into the bedrock 52. The secondary hole 66 is deeper than the length of the main storage tank 26 of the storage assembly 10. The secondary hole 66 is also wider than the widest section of the storage assembly 10.

Figure 5:
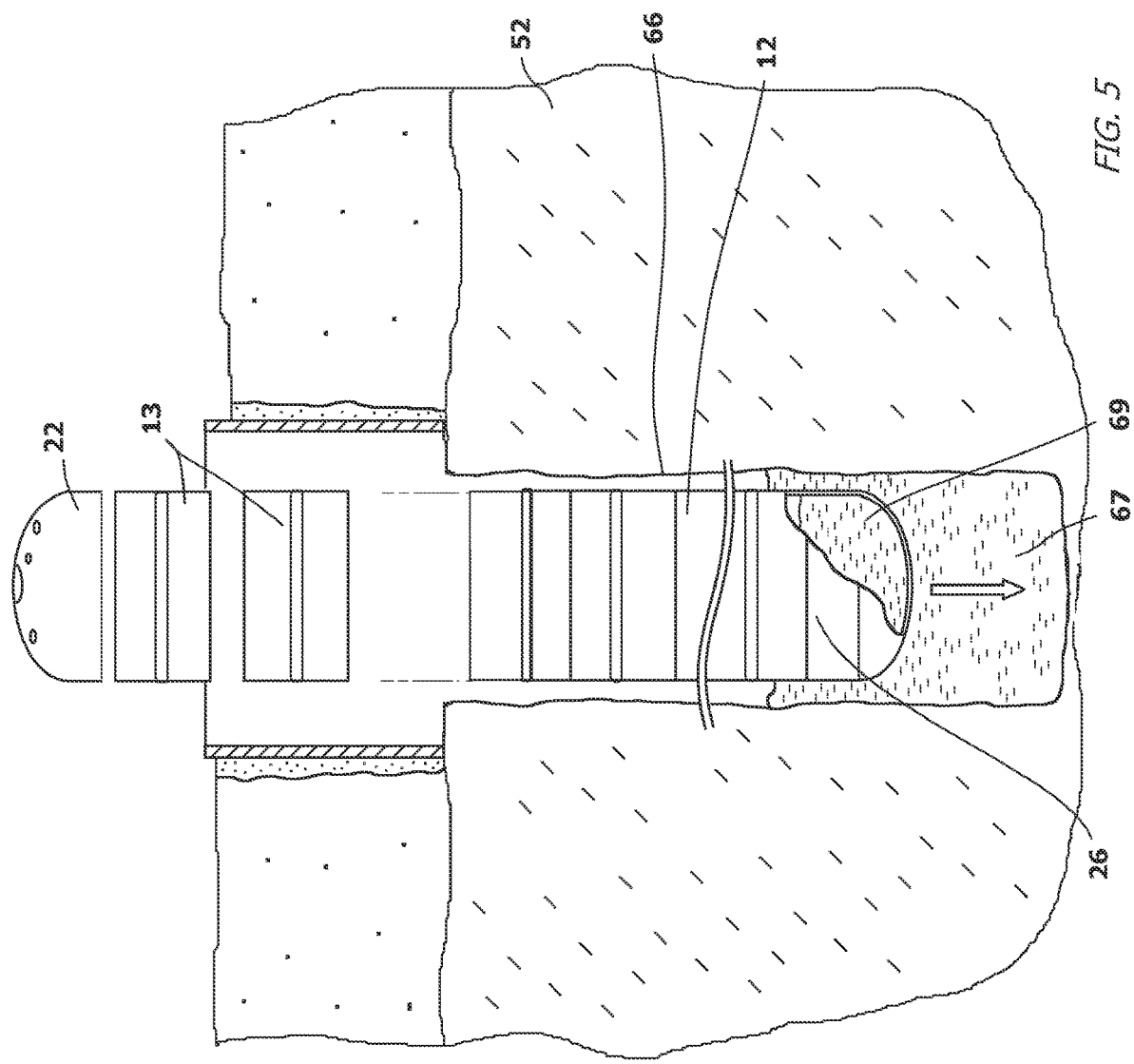
FIG. 5 shows a third step in constructing the subterranean storage system.
Figure 6:
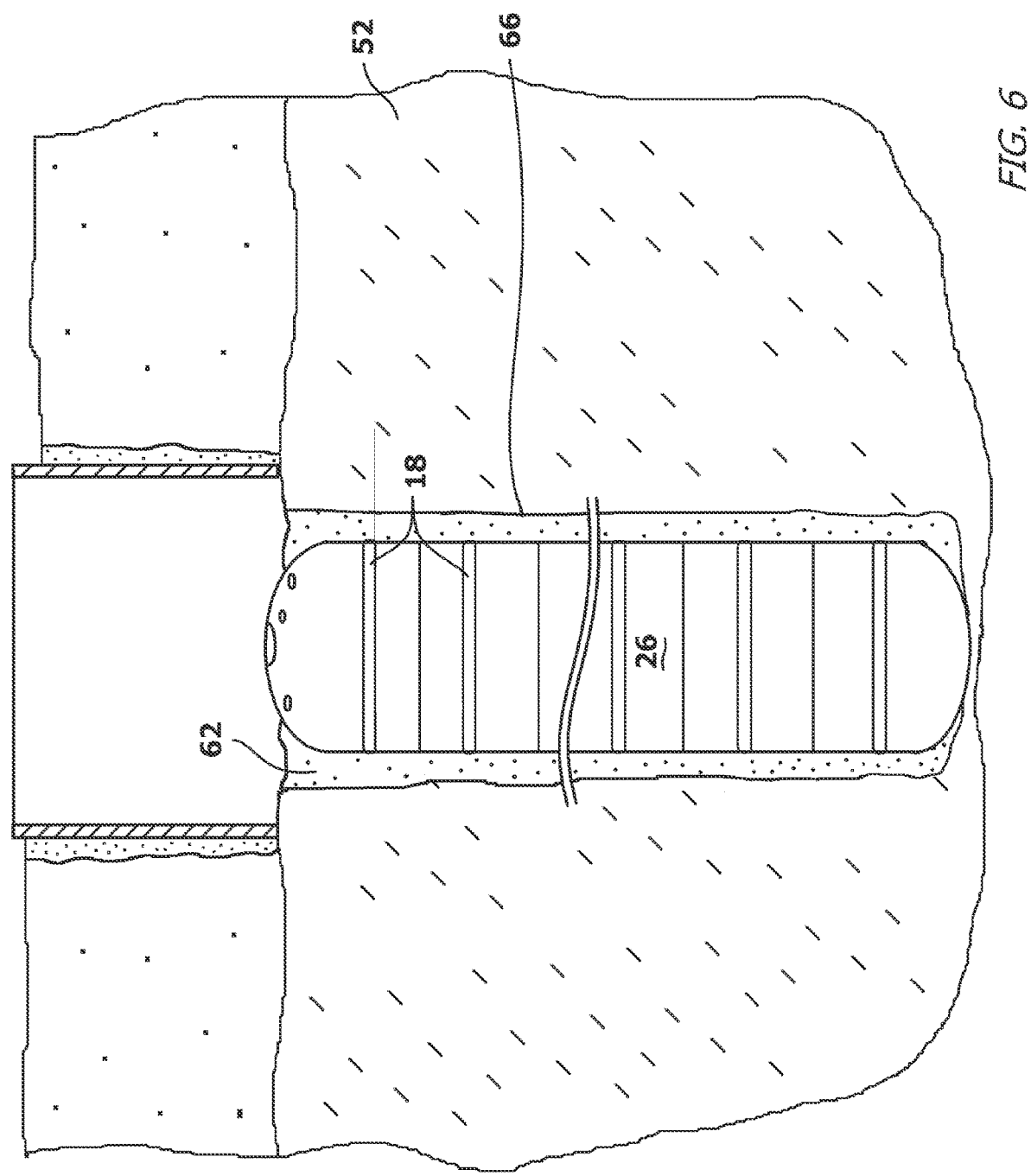
FIG. 6 shows a final step in installing the subterranean storage system.

Referring to FIG. 5 and FIG. 6 in conjunction with FIG. 4 and FIG. 1, the main storage tank 26 is vertically oriented and is placed into the secondary hole 66. Any gap space in the secondary hole 66 between the main storage tank 26 and the bedrock 52 is filled with well cement 62. The well cement 62 flows around the reinforcement rings 18 and firmly sets the main storage tank 26 into the bedrock 52. The reinforcement rings 18 also help prevent any deformation of the main storage tank 26 as the well cement 62 is being poured.

Figure 7:
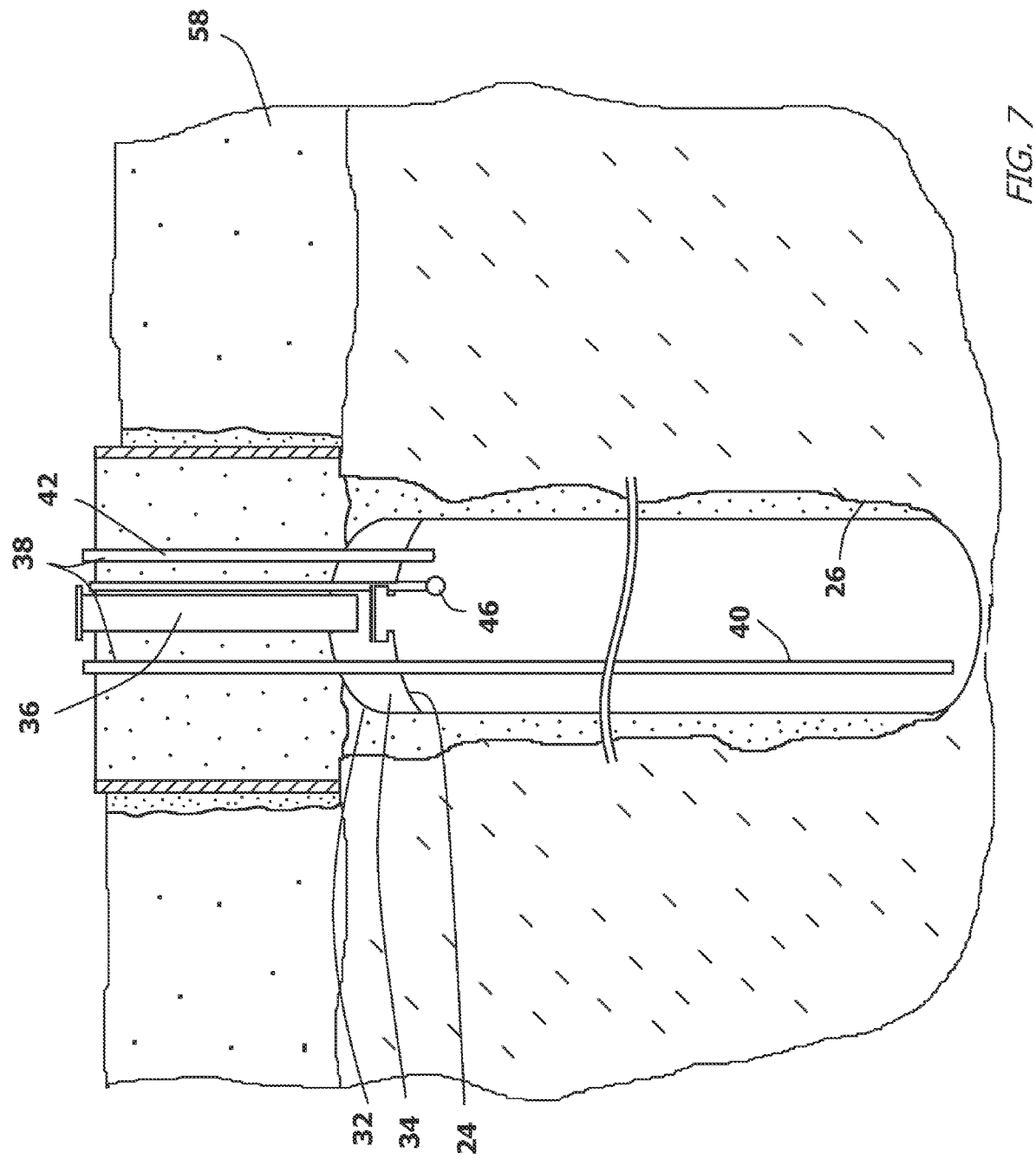
FIG. 7 shows a cross section of a fully installed subterranean storage system.

Referring to FIG. 7 in conjunction with FIG. 1, it will be understood that once the main storage tank 26 is set, the pipe risers 38 and the manway tunnel tube 36 are installed. The pipe risers 38 and the manway tunnel tube 36 are all made long enough to extend through the overburden 58. The overburden 58 is then backfilled into the initial hole 56.

As a safety measure, the interstitial space 34 within the double containment closure 22 can be pressurized to a pressure that is lower than the pressure within the main storage tank 26. This interstitial pressure can be monitored. Any increase or decrease in the interstitial pressure would indicate a leak from the main storage tank 26 or from the interstitial space 34. More particularly, the interstitial space 34 can be pressurized to a pressure that is midway between atmospheric pressure and an average storage pressure. This would allow for both the end closure 24 and the second closure 32 to resist one half of the storage pressure rather than the full storage pressure.

Once the overburden 58 is replaced, the storage assembly 10 can be used to store a variety of gasses and/or liquids. The main storage tank 26 can be internally covered with a protective coating 70 that prevents the steel of the main storage tank 26 from reacting with the material being stored. Furthermore, depending upon the material being stored, different modes of storage operations are possible. If uncompensated gas is to be stored, the stored gaseous fluid is injected into, and drawn from, the highpoint riser 42 near the top of the main storage tank 26. If gas is to be stored using water or other liquid compensation, gas can be injected and withdrawn into the main storage tank 26 through the high point riser 42 while the compensation liquid is withdrawn and injected through the low point riser 40. For uncompensated liquid storage, the stored liquid is injected from the surface through the low point riser 40. The liquid can then be retrieved through the same low point riser 40. For compensated liquid storage, the stored liquid is injected and retrieved through the high point riser 42 while the compensation liquid is retrieved and injected through the low point riser 40.

It will be understood that the configurations of the present invention that are illustrated and described are merely exemplary and that a person skilled in the art can make many variations to those configurations. All such embodiments are intended to be included within the scope of the present invention as defined by the claims.

What is claimed is:

1. A method of forming a subterranean storage facility at a location where there is underlying bedrock covered by overburden, said method comprising:
   providing a storage tank having a cylindrical casing with a top closure and a bottom closure, wherein said storage tank has a maximum first width and a maximum first length;
   providing a secondary closure over said top closure, wherein an interstitial space exists between said top closure and said secondary closure;
   excavating a first hole through the overburden to access the underlying bedrock;
   excavating a second hole into the bedrock, wherein said second hole is wider and longer than said storage tank;
   erecting said storage tank in said second hole with said top closure facing said first hole, wherein gap spaces exist between said storage tank and said second hole when said storage tank is placed in said second hole;
   filling said gap spaces between said storage tank and the bedrock in said second hole with a cement mixture;
   extending pipe risers into said storage tank through said top closure, wherein said pipe risers extend through said first hole and provide access to said storage tank; and
   filling said first hole.

2. The method according to claim 1, further including extending a manway tunnel into said interstitial space, wherein said manway tunnel extends through said first hole.

3. The method according to claim 2, further including providing a closable ingress port through said top closure that provides access into said storage tank, wherein said closable ingress port is accessible within said interstitial space.

4. The method according to claim 3, wherein said closable ingress port and said manway tunnel are sized to enable a person to pass therethrough and access said storage tank.

5. The method according to claim 1, wherein extending said pipe risers into said storage tank includes extending a first pipe riser into said storage tank to a point near said top closure and extending a second pipe riser into said storage tank to a point near said bottom closure.

6. The method according to claim 1, further including providing reinforcement rings around said cylindrical casing of said storage tank to strengthen said cylindrical casing, wherein said reinforcement rings are exposed and are covered by said cement mixture in said second hole.

7. The method according to claim 1, further including setting a casing in said first hole that extends to the underlying bedrock.

8. The method according to claim 7, wherein open areas exist between said casing and the overburden and said open areas are filled with a cement mixture.

9. A method of forming a subterranean storage facility, said method comprising:
   providing a storage tank having a top and a bottom, said storage tank having a double container closure that contains a first closure and a second closure, wherein an interstitial space exists between said first closure and said second closure;
   excavating a hole into bedrock that is large enough to receive said storage tank therein;
   placing said storage tank in said hole with said top of said storage tank facing out of said hole, wherein gap spaces exist between said storage tank and said hole when said storage tank is placed in said hole;
   filling said gap spaces between said storage tank and the bedrock in said hole with a cement mixture;
   extending pipe risers into said storage tank, wherein said pipe risers extend out of said hole and provide access to said storage tank.

10. The method according to claim 9, further including extending a manway tunnel into said interstitial space.

11. The method according to claim 10, further including providing a closable ingress port through said first closure that provides access into said storage tank, wherein said closable ingress port is accessible within said interstitial space.

12. The method according to claim 11, wherein said closable ingress port and said manway tunnel are sized to enable a person to pass therethrough and access said storage tank.

13. The method according to claim 9, wherein extending said pipe risers into said storage tank includes extending a first pipe riser into said storage tank to a point near said top and extending a second pipe riser into said storage tank to a point near said bottom.

14. The method according to claim 9, further including providing reinforcement rings around said storage tank, wherein said reinforcement rings are exposed and are covered by said cement mixture in said hole.

15. The method according to claim 9, further including setting a casing above said hole that that provides access to said hole the bedrock.

\* \* \* \* \*